United States Patent [19]
Oyagi et al.

[11] Patent Number: 4,713,659
[45] Date of Patent: Dec. 15, 1987

[54] PAGER WITH DISPLAY
[75] Inventors: Takashi Oyagi; Kazuyuki Tsunoda, both of Tokyo, Japan
[73] Assignee: NEC Corporation, Tokyo, Japan
[21] Appl. No.: 754,112
[22] Filed: Jul. 12, 1985
[30] Foreign Application Priority Data
  Jul. 18, 1984 [JP] Japan ................ 59-150421
[51] Int. Cl.[4] .............................. G09G 3/18
[52] U.S. Cl. ..................... 340/825.44; 340/311.1; 340/765; 116/263
[58] Field of Search ............ 340/825.44, 761, 793, 340/792, 765, 311.1; 362/802; 455/154, 159; 116/257, 263

[56] References Cited
U.S. PATENT DOCUMENTS 3,849,979 11/1974 Tanji ............................ 340/793
3,937,004 2/1976 Natori et al. ............... 340/825.44
4,536,761 8/1985 Tsunoda et al. ........... 340/825.44
4,644,350 2/1987 Ishii ............................. 340/765

FOREIGN PATENT DOCUMENTS 3210800 10/1983 Fed. Rep. of Germany ... 340/311.1
56-56046 5/1981 Japan .......................... 455/159
0105329 6/1985 Japan .......................... 455/159

Primary Examiner—Gerald L. Brigance
Attorney, Agent, or Firm—Sughrue, Mion, Zinn, Macpeak & Seas

[57] ABSTRACT

A pager with a passive display, for example, a liquid crystal display, also has a sensor for sensing ambient light levels. The display is automatically illuminated when the ambient light level falls below a given threshold and the sensor is then either altered to detect a higher light level or disabled for a given time period so that the illumination does not falsely affect the sensor.

26 Claims, 12 Drawing Figures

Fig. 1 PRIOR ART
Fig. 4
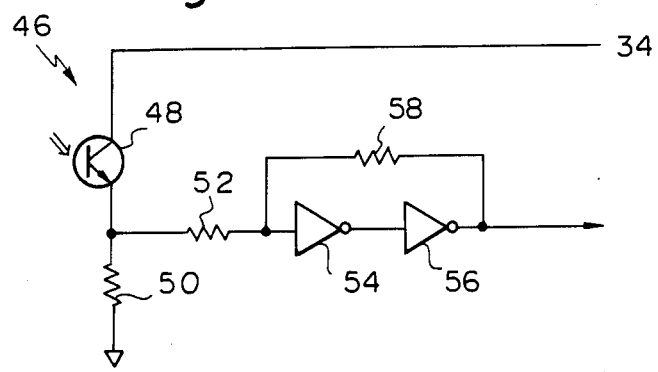
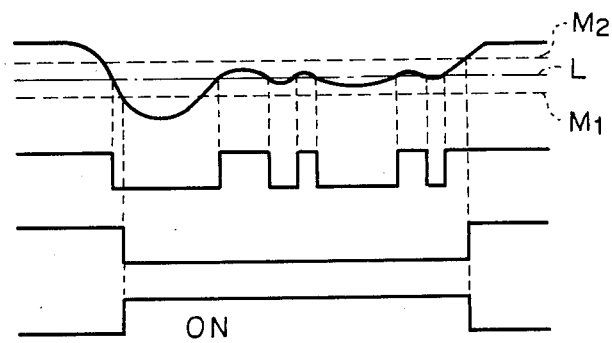
Fig. 5A
Fig. 5B
Fig. 5C
Fig. 5D

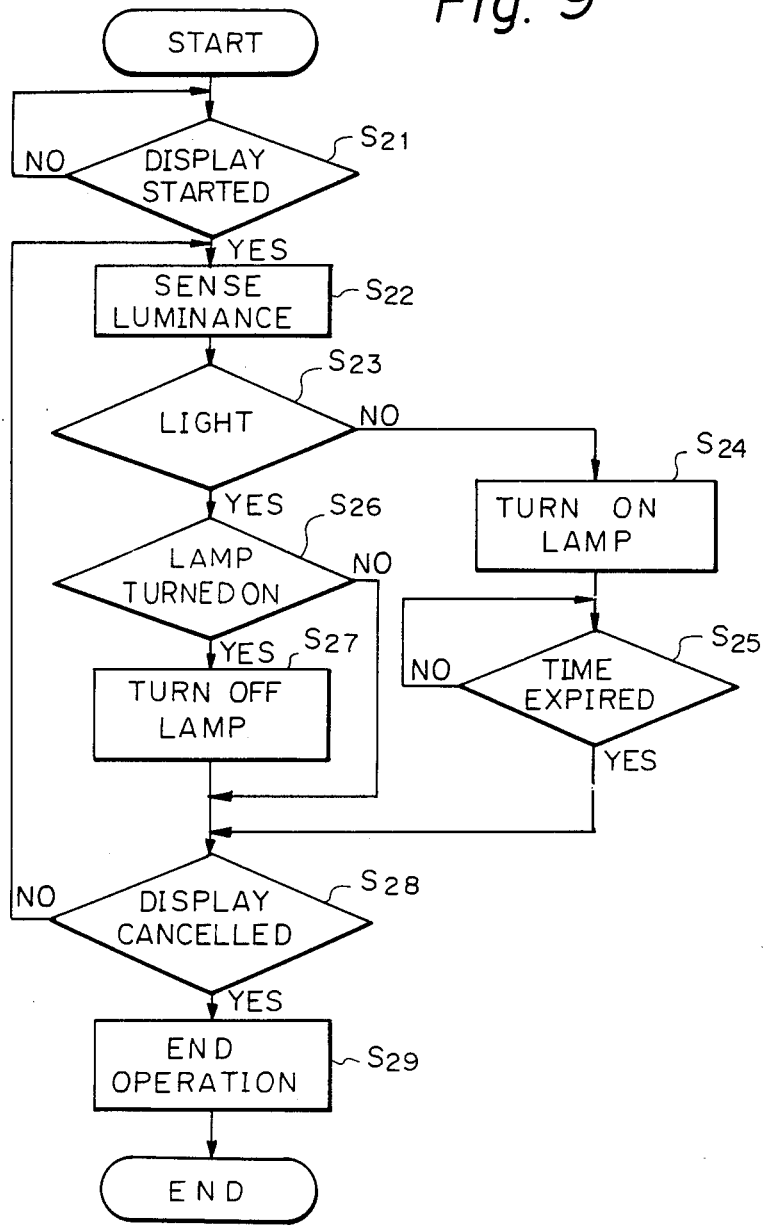

PAGER WITH DISPLAY

BACKGROUND OF THE INVENTION

The present invention relates to a pager with a display and, more particularly, to a display pager of the type using liquid crystal or like display elements which are not themselves radiant, and which is capable of automatically illuminating the display as the external luminance becomes low.

Some modern pagers are capable of displaying data in numerals and messages to convey such information to the user. The prerequisite for this type of pager is that it be small in size and portable and, to meet this need, non-radiant liquid crystal elements which consume a minimum of power are widely used. Because these display elements are non-radiant as mentioned, such a pager is provided with a lamp for illumination and a switch associated with the lamp.

One approach to a smaller-size configuration is to replace the switch with a light-sensing photo-sensing phototransistor, as disclosed in Japanese Patent Application Ser. No. 58-178683 corresponding to U.S. patent application Ser. No. 654,082, now U.S. Pat. No. 4,644,350, 2-17-87, EPC Patent Application No. 84 111 419.2, Canadian Patent Application No. 463,961 An example of the phototransistor scheme is shown in FIG. 1.

In the prior art pager shown in FIG. 1, phototransistor 10a is sensitive to external luminance and, when it is low, turns on a lamp 10b. When the lamp 10b is turned on, light issuing from the lamp 10b is diffused inside a diffuser plate 12 and transmitted sequentially through liquid crystal 14 and an acryl plate 16 as indicated by arrows, thereby allowing displayed data to be read by the user. A partition plate 18 serves to intercept a part of the light from the lamp 10b which is directed toward the phototransistor 10a.

However, although the partition plate 18 successfully prevents the light from the lamp 10b from becoming directly incident to the phototransistor 10a, it fails to intercept the light reflected by the acryl plate 16 as well as externally derived light. Therefore, when the external luminance is dim, the display cannot function in a positive manner. Specifically, when the luminance level is near the threshold level which will permit photosensor 10a to turn on the lamp, the output signal of the photosensor is susceptive to even insignificant changes in the ambient conditions and leakage of light issuing from the lamp 10b (as is indicated by phantom lines in FIG. 1) can cause the lamp 10b to repeatedly turn on and off at short intervals, rendering the displayed information difficult to see.

SUMMARY OF THE INVENTION

It is therefore an object of the present invention to provide a display pager which eliminates the above-discussed drawback and allows displayed information to be read with ease even in a dim ambient.

It is another object of the present invention to provide a generally improved display pager.

The pager of the present invention comprises a data processing circuit for processing a received signal to generate an information signal to be displayed and a control signal, a display circuit for optically displaying on the display the information signal which is outputted from the data processing circuit, a light sensor for sensing the external luminance level around the display circuit and for applying a first sense signal to the data processing circuit when the level is lower than a first predetermined value, and an illuminating circuit for illuminating the display responsive to the control signal output from the data processing circuit, the illuminating circuit including a lamp.

The data processing circuit is constructed to generate the control signal when the external luminance sensed by the light sensor is lower than the first predetermined value and the display of the display circuit is maintained.

In accordance wtih the present invention, a pager has a display implemented with, for example, a liquid crystal and senses the external luminance so that the display can be automatically illuminated when the luminance has decreased.

The above and other objects, features and advantages of the present invention will become more apparent from the following detailed description taken with the accompanying drawings.

BRIEF DESCRIPTION OF THE DRAWINGS

FIG. 1 is a schematic view of a prior art display pager;

FIG. 4 is the diagram showing the specific construction of a light sensing circuit;

FIGS. 5A-5D show signals appearing in the light sensing circuit and the on-off condition of a lamp;

FIG. 9 is a chart representative of the operation of the pager of FIG. 8.

DESCRIPTION OF THE PREFERRED EMBODIMENTS

While the display pager of the present invention is susceptible of numerous physical embodiments, depending upon the environment and requirements of use, substantial numbers of the herein shown and described embodiments have been made, tested and used, and all have performed in an eminently satisfactory manner.

Figure 2:
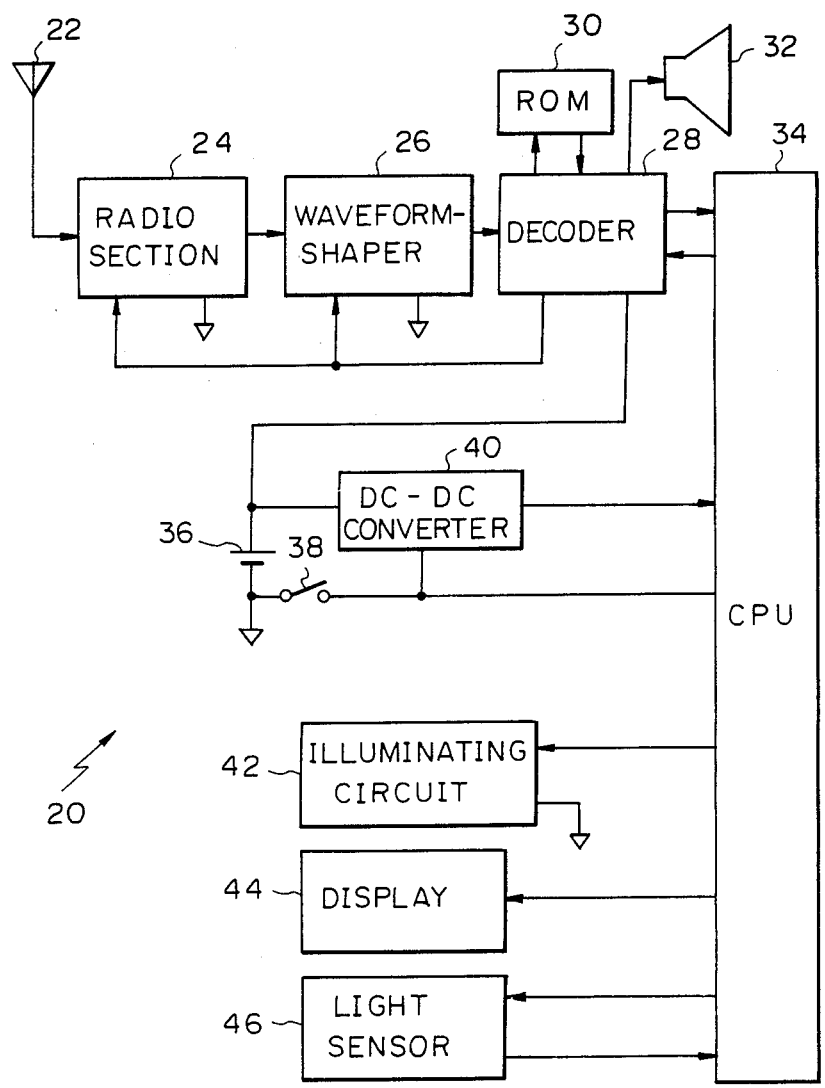
FIG. 2 is a block diagram of a display pager embodying the present invention.

Referring to FIG. 2 of the drawings, a display pager in accordance with a preferred embodiment of the present invention is shown and generally designated by the reference numeral 20. A signal coming in through an antenna 22 is applied to a radio section 24 which is interconnected with a waveform-shaper 26. The waveform-shaper 26 is interconnected with a decoder 28 which in turn is interconnected with a read only memory (ROM) 30, a speaker 32, and a microprocessor (CPU) 34. A power source 36 has a negative terminal connected to a common potential point and to one terminal of a switch 38, and a positive terminal connected to the decoder 28 and to one input terminal of a DC-DC converter 40. The other terminal of the switch 38 is connected to the other input of the DC-DC converter 40 and to the CPU 34. An output terminal of the DC-DC converter 40 is connected to the CPU 34. Power from the power source 36 is routed via the decoder 28 to the radio section 24 and waveform-shaper 26. The output of the DC-DC converter 40 is applied to an illuninating circuit 42, a display 44 and a light sensing circuit 46 by way of the CPU 34. The CPU 34 is connected to the illuminating circuit 42, display 44 and light sensing circuit 46. The output of the light sensing circuit, or light sensor, 46 is fed to the CPU 34.

The radio section 24 amplifies and demodulates the signal coming in through the antenna 22. The waveform-shaper 26 converts the demodulated signal to a digital signal having a format which the decoder 28 can decode. The ROM 30 is adapted to store a call number assigned to the pager 20. The decoder 28 compares an output of the waveform-shaper 26 with the call number stored in the ROM 30 and, when they coincide with each other, applies a signal to the speaker 32 to cause it to sound, thereby alerting the user. The DC-DC converter 40 boosts the voltage applied thereto from the power source 36 so as to supply the CPU 34 with power. The switch 38 is a power switch which is manually actuated. Once the switch 38 is closed, the DC-DC converter 40 is activated to feed power to the CPU 34. When the pager 20 is called, the decoder 28 reads message data which follows the call number data and applies the message data to the CPU 34. Then, the CPU 34, which includes a circuit for driving liquid crystal display segments, causes the display 44, which comprises the liquid crystal display segments, to display the message. The illuminating circuit 42 is equipped with a lamp for illuminating the display 44 and is controlled by power which is applied from the CPU 34. The light sensor 46 converts external luminance to an electrical signal which is applied to the CPU 34.

A characteristic feature of this particular embodiment is that the light sensor 46 is responsive to a first predetermined reference value associated with relatively dark ambient and a second predetermined reference value associated with relatively light ambient. Specifically, the output of the light sensor 46 becomes (logical) 0 when the external luminance is lower than the first reference value (dark) and maintains the 0 level until the luminance increases beyond the second reference value (light). Conversely, the light sensor 46 produces a 1 output when the external luminance is higer than the second reference level and maintains it until the luminance decreases beyond the second reference level.

Figure 3:
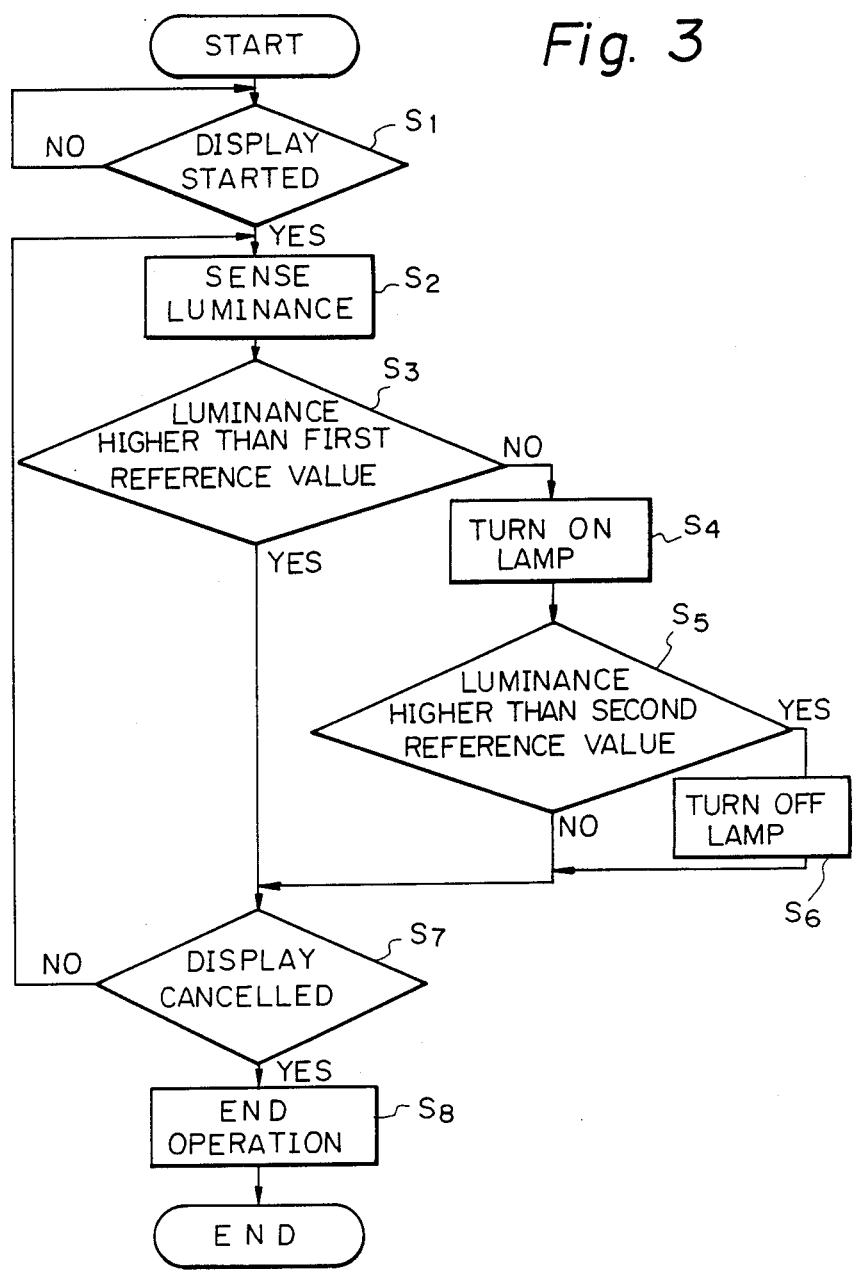
FIG. 3 is a flowchart demonstrating the operation of the pager of FIG. 2.

Referring to FIG. 3, the display illuminating operation of the pager 20 in accordance with the illustrative embodiment is demonstrated. The operation begins when the switch 38 is closed by the user as previously mentioned. As a message is displayed on the display 44, the CPU 34 supplies power to the light sensor 46 to cause it to start measuring external luminance. ($S_1$ and $S_2$) If the measured luminance is higher than the first reference value, the illuminating circuit 42 is not supplied with power and, therefore, the lamp is not turned on. If it is lower than the first reference value, the CPU 34 supplies power to the illuminating circuit 42 to turn on the lamp to thereby illuminate the display 44. ($S_3$ and $S_4$) In this condition, as the luminance increases beyond the second reference level, the power supply to the illuminating circuit 42 is interrupted to turn off the lamp. ($S_5$ and $S_6$) This procedure continues until the display of the message on the display 44 is terminated. ($S_2 \sim S_7$) When the display is cancelled, the supply of power to the illuminating circuit and light sensor 46 is inhibited. ($S_7$ and $S_8$)

A specific example of the light sensor 46 is shown in FIG. 4. In this example, a phototransistor 48 has a collector connected to the CPU 34 and an emitter connected to a common potential point via a resistor 50. The emitter of the phototransistor 48 is also connected to one terminal of a resistor 52 the other terminal of which is connected to an input terminal of an inverter 54. An output terminal of the inverter 54 is connected to an input terminal of another inverter 56, an output terminal of which is connected via a resistor 58 to the input terminal of the inverter 54. The resistors 52 and 58 and the inverters 54 and 56 constitute a Schmitt circuit.

Referring to FIGS. 5A-5D, signals appearing in the light sensor 46 and the on-off condition of the lamp are shown. FIG. 5A represents the output signal or voltage of the phototransistor 48, higher voltages corresponding to higher external luminance. In FIG. 5A, the vertical axis of the signal is shown in a doubled scale compared to the other signals for the convenience of description. When the output signal of the phototransistor 48 is binarized with an intermediate level L as a threshold, it will appear as shown in FIG. 5B. Heretofore, the output signal of the phototransistor 48 has been directly read by the CPU 34 so as to control the illuminating circuit 42, that is, the binary signal shown in FIG. 5B has been used to on-off control the lamp. Such has brought about a problem where the lamp repeatedly turns on and off at short intervals in a dim situation in which the output of the phototransistor 48 approximates the intermediate level L.

The output signal of the inverter 56 is shown in FIG. 5C. A Schmitt circuit has two different threshold voltages $M_1$ and $M_2$ ($M_1 < M_2$) and operates with hysteresis. Specifically, the output voltage of the inverter 56 becomes low when the output voltage of the phototransistor 48 has dropped below the threshold level $M_1$ and remains low until it rises above the threshold level $M_2$. Conversely, as the output voltage of the phototransistor 48 rises beyond the threshold level $M_2$, the inverter 56 produces a high voltage; the high voltage output of the inverter 56 is maintained until the phototransistor output drops beyond the threshold level $M_1$. FIG. 5D shows the on-off condition of the lamp in accordance with the illustrative embodiment, the high level representing an "on" condition. The CPU 34 turns on the lamp when the output voltage of the light sensor 46 is low when a message is being displayed on the display 44. In this particular embodiment, the lamp does not turn on and off at short intervals even in a dim ambient.

While the light sensor 46 in the above embodient has been implemented by a Schmitt circuit, equivalent control over the illuminating circuit may be accomplished based on program control by applying the output of the phototransistor 48 to a microprocessor via an analog-to-digital converter to cause the microprocessor to compare the input signal with the two threshold levels.

Figure 6:
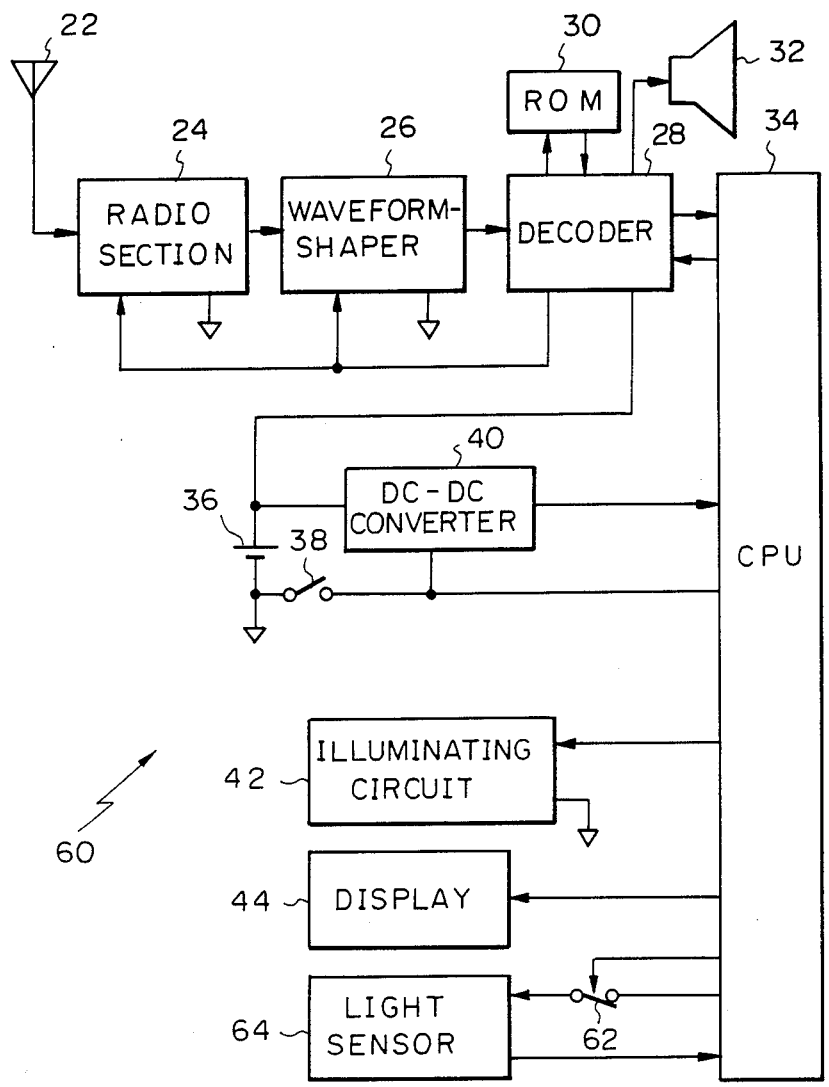
FIG. 6 is a block diagram showing another embodiment of the present invention.

Referring to FIG. 6, another embodiment of the display pager in accordance with the present invention is shown. In FIG. 6, the same or similar structural elements are designated by like reference numerals. The major difference between the pager, generally 60, of this embodiment and the previously discussed pager 20 is that in the former the CPU 34 has an output terminal for display illumination connected to the illuminating circuit 42, an output terminal for message display connected to the display 44, and an output terminal for light sensing connected to a light sensor 64 via a switch 62.

The output of the light sensor 64 is coupled to the CPU 34. The switch 62 is controlled by the CPU 34.

The second illustrative embodiment is characterized in that once power is applied to the illuminating circuit 42 to turn on the lamp, the power supply to the circuit 42 is maintained until the display of the message on the display 44 is cancelled. Specifically, the switch 62 in an initial condition is closed to cause the light sensor 64 to measure external luminance. While the external luminance is low, the ouput voltage of the light sensor 64 remains lower than a predetermined value so that the CPU 34 supplies power to the illuminating circuit 42 and, at the same time, opens the switch 62. This interrupts the power supply to the light sensor 64, the ouput of which is then "0". While the light sensor output is "0", the CPU 34 applies power to the illuminating circuit 42 to turn on the lamp. The switch 62 remains open unless the message appearing on the display 44 is cancelled either automatically or manually. The light sensor 64 shown in FIG. 6 may be implemented with the circuit made up of the phototransistor 48 and resistor 50 as shown in FIG. 4.

Figure 7:
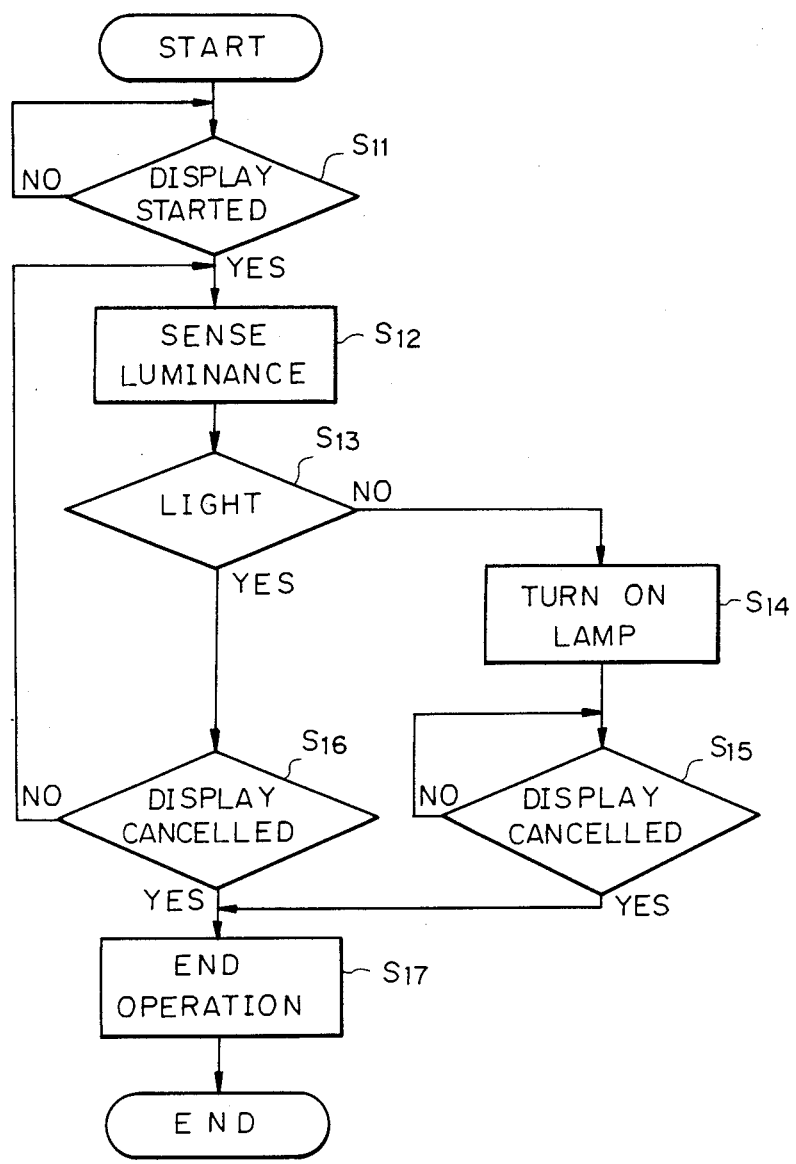
FIG. 7 is a flowchart representative of the operation of the pager of FIG. 6.

The operation of the pager 60 is shown in a flowchart in FIG. 7. When a message is provided on the display 44, the CPU 34 supplies power to the light sensor 64 to cause the latter to start measuring external luminance. ($S_{11}$ and $S_{12}$) If the luminance has measured lower than a predetermined value, power is fed to the illuminating circuit 42 to turn on the lamp. ($S_{13}$ and $S_{14}$) Once turned on, the lamp remains in that state until the message on the display 42 is cancelled. ($S_{15}$) If the luminance has measured higher than the predetermined value, the measurement is repeated until the end of display. ($S_{12}$, $S_{13}$ and $S_{16}$) Upon termination of the display of the message, the supply of power to the illuminating circuit 42 and light sensor 64 is inhibited. ($S_{17}$)

In this particular embodiment, control is effected in a specific mode, i.e., to turn on the lamp when the light sensor output is lower than a predetermined value, in order to reduce modification of the control program. However, the illustrative embodiment can be practiced even if the control program is so modified as to maintain the lamp turned on without regard to the light sensor output after the lamp has been turned on.

In addition, since the pager 60 shown in FIG. 6 is constructed to interrupt the power supply to the light sensor 64 when the lamp has been turned on, it reduces the power which is consumed by the light sensor 64.

Figure 8:
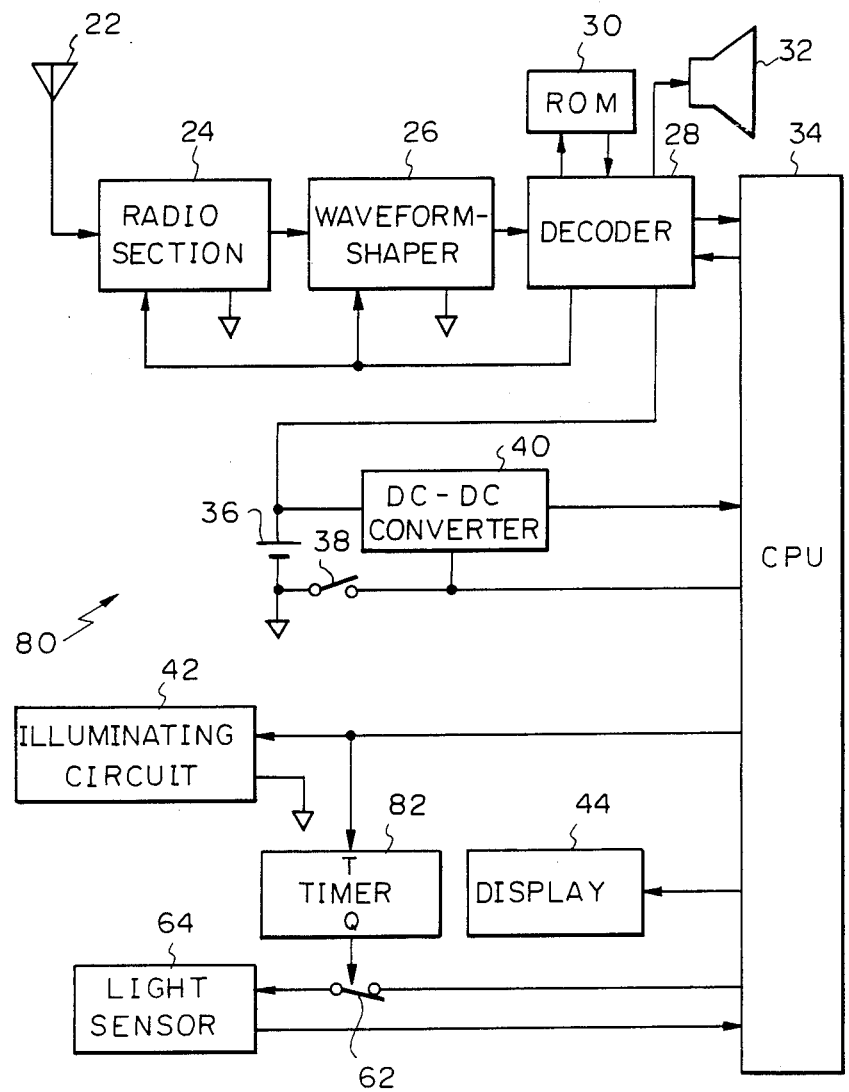
FIG. 8 is a block diagram showing another embodiment of the present invention.

Referring to FIG. 8, another embodiment of the display pager in accordance with the present invention is shown. In FIG. 8, the same or similar structural elements are again designated by like reference numerals. The pager, generally 80, shown in FIG. 8 differs from the pager 60 of FIG. 6 in that it includes a timer 82 between the CPU 34 and the switch 62. The CPU 34 has an output terminal for display illumination connected to a trigger input terminal T of the timer 82. An output Q of the timer 82 is adapted to open and close the switch 62.

What characterizes this particular embodiment is that once power is supplied to the illuminating circuit 42, it is not interrupted until a predetermined period of time expires. Specifically, when power is applied to the circuit 42, it triggers the time 82 so that the ouput Q of the time 82 is maintained at the 1 level for a predetermined period of time. The "1" output of the timer 82 opens the switch 62 to cut off the power supply from the CPU 34 to the light sensor 64, resulting in a "0" light sense signal. While the ligt sense signal is maintained at "0", the CPU 34 applies power to the illuminating circuit 42 to turn on the lamp. Upon the lapse of the predetermined period of time, the timer 82 switches its output Q from "1" to "0" to close the switch 62, thereby reactivating the light sensor 64.

The operation of the pager 80 is shown in a flowchart in FIG. 9. Upon the appearance of a message on the display 44, the CPU 34 applies power to the light sensor 64 which then starts measuring external luminance. ($S_{21}$ and $S_{22}$) If the luminance has measured lower than a predetermined value, power is supplied to the illuminating circuit 42 and timer 82 with the result that a predetermined period of time elapses with the lamp maintained on. ($S_{23} \sim S_{25}$) If the luminance has measured higher than the predetermined value, the lamp if then on is turned off. ($S_{23}$ and $S_{26}$) Such a sequence of events continues until the message on the display 44 is cancelled. ($S_{22}$, $S_{23}$, $S_{26} \sim S_{28}$) After the message display has been cancelled, the supply of power to the illuminating circuit 42, light sensor 64 and timer 82 is inhibited. ($S_{29}$)

In the illustative embodiment, the output signal of the light sensor 64 is turned to "0" to control the duration of the "on" condition of the lamp. Alternatively, an arrangement may be made such that the output Q of the timer 82 is applied to the CPU 34 in order to continuously turn on the lamp while the output Q of the timer 82 is "1".

Further, if the duration of the "on" state of the lamp is long enough to read a message on the display 44, the lamp may be turned off without performing a further light sensing step after the lamp has been turned on.

The embodiment shown in FIG. 8 reduces the power which is consumed by the illuminating circuit 42, compared to the embodiment of FIG. 6.

Again, the embodiments shown in FIG. 6 or 8 may be implemented using program control, instead of the switch 62 and timer 82.

In summary, it will be seen that the present invention provides the display pager which prevents a lamp from repeatedly turning on and off at short intervals in a dim situation or due to leakage of light issuing from the lamp. The pager, therefore, accomplishes an automatic illuminating function responsive to the external luminance without degrading displayed information, thereby accurately convey a message meant for the pager user.

Various modifications will become possible for those skilled in the art after receiving the teachings of the present disclosure without departing from the scope thereof.

What is claimed is:

1. A display pager, comprising:
   data processing means for processing a received signal to generate an information signal, and for generating a control signal;
   display means for optically diplaying on the display alphanumeric characters corresponding to the information signal output by said data processing means;
   light sensor means for sensing an external luminance level in the vicinity of said display means and for applying a first sense signal to the data processing means when said luminance level is lower than a first predetermined value, and for applying a second sense signal to the data processing means when said luminance level is above a second predetermined value which is higher than said first predetermined value; and illuminating means for illuminating the display means in response to the control signal output from the data processing means, said illuminating means including a lamp;

the data processing means generating said control signal in response to said first sense signal during the operation of the display of the display means and controlling said illuminating means to turn off said lamp in response to said second sense signal.

2. A pager as claimed in claim 1, wherein said data processing means turns off said lamp when the operation of the display of the display means is terminated.

3. A display pager comprising:

data processing means for processing a received signal to generate an information signal and for generating a control signal;

display means for optically displaying on the display alphanumeric characters corresponding to the information signal output by said data processing means;

light sensor means for sensing an external luminance level in the vicinity of said display means, said sensor means applying a first sense signal to the data processing means when said external luminance level is lower than a first predetermined value;

illuminating means for illuminating the display means in response to the control signal output from the data processing means, said illuminating means including a lamp; and timer means triggered by said control signal for inhibiting the sensing operation of the light sensor means until the expiration of a predetermined period of time, the data processing means generating said control signal in response to said first sense signal.

4. A pager as claimed in claim 3, further comprising means for reactivating said light sensor means upon the expiration of said predetermined period of time.

5. A pager as claimed in claim 3, further comprising means for turning off the lamp upon the expiration of said predetermined period of time.

6. A pager, comprising:

display means for displaying a message;

means for sensing an external luminance level in the vicinity of said display means and producing a first sense signal when said external luminance level falls below a first predetermined level, and producing a second sense signal when said external luminance level exceeds a second predetermined level after said first sense signal has been produced, said second predetermined level being higher than said first predetermined level;

means for illuminating said display means; and control means for turning on said illuminating means in response to said first sense signal during the display of said message on said display means and for turning off said illuminating means in response to said second sense signal.

7. A pager as claimed in claim 6, further comprising:

means for receiving a paging signal followed by said message; and means for detecting coincidence between a call number represented by said paging signal and a call number assigned to said pager and for outputting said message subsequent to said detection.

8. A pager as claimed in claim 6, wherein said illuminating means comprises a lamp.

9. A pager as claimed in claim 6, wherein said sensing means comprises a phototransistor and a Schmitt trigger circuit connected to an output of said phototransistor.

10. A pager as claimed in claim 6, wherein said control means comprises a microprocessor.

11. A method of controlling the illumination of a display of a pager, comprising the steps of:

displaying a message on said display;

sensing an external luminance level in the vicinity of said display;

illuminating said display when said message is being displayed on said display and the sensed external luminance level falls below a first predetermined level; and terminating the illumination of said display when said sensed external luminance level exceeds a second predetermined level which is higher than said first predetermined level.

12. A method as claimed in claim 11, further comprising the steps of:

receiving a paging signal followed by said message; and comparing a call number represented by said paging signal with a call number assigned to said pager and providing said message for said display when said call nubmers coincide with each other.

13. A pager, comprising:

display means for displaying a message;

means for sensing an external luminance level in the vicintity of said display means;

means for illuminating said display means when said message is being displayed on said display means and the sensed external luminance level falls below a predetermined level; and control means for deactivating said sensing means until the display of said message on said display means is terminated.

14. A pager as claimed in claim 13, further comprising:

means for receiving a paging signal followed by said message; and means for detecting coincidence between a call number represented by said paging signal and a call number assigned to said pager and for outputting said message subsequent to said detection.

15. A pager as claimed in claim 13, wherein said illuminating means comprises a lamp.

16. A pager as claimed in claim 13, wherein said sensing means comprises a phototransistor and a Schmitt trigger circuit connected to an output of said phototransistor.

17. A pager as claimed in claim 13, wherein said control means comprises a microprocessor.

18. A method of controlling the illumination of a display of a pager, comprising the steps of:

displaying a message on said display;

sensing an external luminance level in the vicinity of said display;

illuminating said display when said message is being displayed on said display and the sensed external luminance level falls below a predetermined level; and thereafter discontinuing said sensing step until the display of said message on said display means is terminated.

19. A method as claimed in claim 18, further comprising the steps of:
   receiving a paging signal followed by said message; and
   comparing a call number represented by said paging signal with a call number assigned to said pager and providing said message for said display when said call numbers coincide with each other.

20. A pager, comprising:
   display means for displaying a message;
   means for sensing an external luminance level in the vicinity of said display means;
   means for illuminating said display means when said message is being displayed on said display means and the sensed external luminance level falls below a predetermined level; and
   control means for deactivating said sensing means for a predetermined time after the sensed external luminance level falls below said predetermined level.

21. A pager as claimed in claim 20, further comprising:
   means for receiving a paging signal followed by said message; and
   means for detecting coincidence between a call number represented by said paging signal and a call number assigned to said pager and for outputting said message subsequent to said detection.

22. A pager as claimed in claim 20, wherein said illuminating means comprises a lamp.

23. A pager as claimed in claim 20, wherein said sensing means comprises a phototransistor and a Schmitt trigger circuit connected to an output of said phototransistor.

24. A pager as claimed in claim 20, wherein said control means comprises a microprocessor.

25. A method of controlling the illumination of a display of a pager, comprising the steps of:
   displaying a message on said display;
   sensing an external luminance level in the vicinity of said display;
   illuminating said display when said message is displayed on said display and the sensed external luminance level falls below a predetermined level; and
   thereafter discontinuing said sensing step until the expiration of a predetermined period of time.

26. A method as claimed in claim 25, further comprising the steps of:
   receiving a paging signal followed by said message; and
   comparing a call number represented by said paging signal with a call number assigned to said pager and providing said message for said display when said call numbers coincide with each other.

* * * * *

UNITED STATES PATENT AND TRADEMARK OFFICE
CERTIFICATE OF CORRECTION

PATENT NO. : 4,713,659

DATED : December 15, 1987

INVENTOR(S) : OYAGI ET AL

It is certified that error appears in the above-identified patent and that said Letters Patent is hereby corrected as shown below:

Column 1, line 21, after "light-sensing" delete "photo-sensing";
    line 25, change "4,644350" to --4,644,350--;
    line 26, after "463,961" add --and Australian Patent Application No. 33489/84.--.
Column 2, line 40, after "FIG. 9 is a" delete "chart" and add --flowchart--.
Column 3, line 45, after "is" delete "higer" and add --higher--.
Column 6, line 1, delete "ligt" and add --light--.
Column 8, line 29, delete "nubmers" and add --numbers--.

Signed and Sealed this

Thirteenth Day of September, 1988

Attest:

DONALD J. QUIGG

Attesting Officer      Commissioner of Patents and Trademarks